PHASE-LOCKED SIGNAL SOURCE

Filed Dec. 13, 1971

United States Patent Office 3,706,046
Patented Dec. 12, 1972

3,706,046

PHASE-LOCKED SIGNAL SOURCE

Harold Seidel, Warren, N.J., assignor to Bell Telephone Laboratories, Incorporated, Murray Hill, N.J.

Filed Dec. 13, 1971, Ser. No. 207,502
Int. Cl. H03f 1/00
U.S. Cl. 330—4.5 5 Claims

ABSTRACT OF THE DISCLOSURE

Phase-locking of one or more separate power sources is a convenient method of amplifying frequency modulated signals or combining the outputs of a plurality of signal sources. Certain types of devices, however, do not submit to phase-locking. In such cases, the sources are used to pump a parametric device, and the parametric device is phase-locked. In this way, phase coherency is induced among the outputs of one or more signal sources, while the sources themselves are operated in their preferred, free-running state.

This invention relates to phase-locked amplifiers and oscillators.

BACKGROUND OF THE INVENTION

It is common practice to amplify a frequency modulated signal by using the signal to phase-lock an oscillator. Since the oscillator is forced to follow the intantaneous frequency deviations of the input signal, the oscillator reproduces the frequency modulation impressed upon the signal. Furthermore, since the oscillator is operating at a higher level than the applied signal, it also, in effect, amplifies the signal. This technique is applicable provided the oscillator is capable of tracking the input signal. There are, however, devices which will not submit to phase-locking, or are incapable of tracking over the required frequency range. There may also be instances where a common oscillator is used for multiple purposes and, hence, may not submit to frequency modulation.

It is, accordingly, the broad object of the present invention to effect the equivalent of phase-locking of a signal source while, in fact, the primary oscillator is free-running.

SUMMARY OF THE INVENTION

In accordance with the present invention, a free-running oscillator provides the pumping power for a parametric amplifier that has a very narrowband signal circuit, and a relatively broadband idler circuit. Since parametric devices are easily phase-locked, a synchronizing signal is coupled into the signal circuit, producing an amplified, coherent output signal.

In a first specific embodiment of the invention, the synchronizing signal is frequency modulated. In order for the narrowband signal circuit to track the input signal, a sample of the latter is frequency detected, and the detected signal used to tune the signal circuit in synchronism with the frequency modulated input signal.

In a second embodiment of the invention, a plurality of parametric devices, pumped by a plurality of free-running oscillators, are synchronized by means of a common signal. The resulting, phase coherent output signals from the several devices are then combined in a common circuit to produce a high power, output signal.

It is an advantage of the present invention that phase coherency is indicated among the outputs of one or more signal sources while the sources themselves are operated in their preferred, free-running state.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
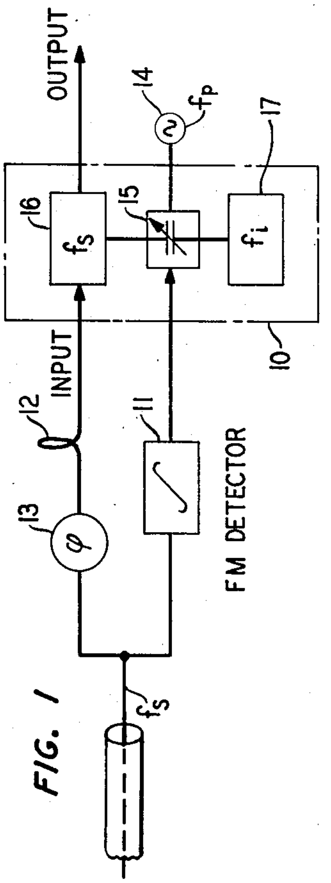
FIG. 1 shows a frequency modulation amplifier in accordance with the present invention.

Referring to the drawings, FIG. 1 shows a parametric device operating as a phase-coherent, frequency modulation amplifier in accordance with the present invention. The amplifier comprises parametric device 10, which can be any one of the many well-known types of parametric devices described in the literature; a pump source 14; a frequency modulation detector 11; a delay network 12; and a phase shifter 13.

Typically, the parametric device is pumped by a source of pumping power 14, which is coupled to a nonlinear reactance 15. For purposes of explanation, the latter is shown to be a varactor diode that is coupled to both a signal circuit 16 and an idler circuit 17. For optimum performance, the signal circuit is initially tuned to the unmodulated carrier signal frequency, and the idler circuit is tuned to the difference between the pump frequency and the signal frequency. Designating the pump frequency $f_p$, the signal frequency $f_s$, and the idler frequency $f_i$, the relationship among the three signal frequencies is given by $$f_p = f_i + f_s \quad (1)$$

In order to minimize the noise in the output signal, the bandwidth of the signal circuit is advantageously made much narrower than the idler circuit bandwidth. A ratio of the order of 1:100 is typical.

In operation, the bias applied to the varactor and the level of pumping power are adjusted such that the parametric device is just at the threshold of oscillation. In practice it can be slightly below the threshold, or oscillating weakly, just above the threshold. In this state, a small input signal, coupled into the signal circuit, is amplified provided the signal frequency falls within the signal circuit bandwidth. Furthermore, the input signal and the resulting output signal are phase coherent.

In order to amplify a frequency modulated signal, particularly one whose frequency deviations exceed the bandwidth of the signal circuit, it is necessary that the signal circuit be tuned so as to track the input signal. Accordingly, in the embodiment of FIG. 1, a frequency modulated input signal $f_s$, derived from a source (not shown) is simultaneously coupled to frequency modulation detector 11, and to signal circuit 16 through delay network 12 and phase shifter 13. The modulation output from detector 11 is applied to the nonlinear reactance 15, in this case a varactor, so as to change the instantaneous bias applied thereto in accordance with the variations in the instantaneous frequency of the input signal. This tunes the signal circuit accordingly. Thus, when the frequency modulated signal is simultaneously applied to the signal circuit, the latter is always tuned to the instantaneous frequency of the frequency modulated signal. To insure synchronism, the relative time delay and the phase of the input signal and the tuning signal are equalized by means of the delay network 12 and phase shifter 13. Thus, the signal circuit tracks the frequency of the input signal, to produce an amplified, frequency modulated output signal that is at all times phase locked to the input signal. The primary oscillator 14, which provides the power for the system, on the other hand, is always free-running at its natural frequency. Changes in either the pump frequency or the signal frequency are, of course, reflected in changes in the idler frequency. However, the idler circuit is made sufficiently broadband to operate at whatever frequency is required to satisfy Equation 1.

As indicated hereinabove, essentially any one of the many well-known parametric devices can be used to practice the invention. Illustrative of but a few such devices are U.S. Pat. 2,978,649, wherein the parametric interaction produced by gyromagnetic material is utilized, and the articles by E. D. Reed entitled "Diode Parametric Amplifiers—Principles and Experiments," published in Semiconductor Products, Part I, January 1961, pp. 25–30; Part II, February 1961, pp. 35–42, wherein a varactor diode is used as the nonlinear reactive element. For a discussion of frequency modulation detectors, see "Frequency Modulation" by A. Hund, published by the McGraw-Hill Book Company, Inc., 1942.

Figure 2:
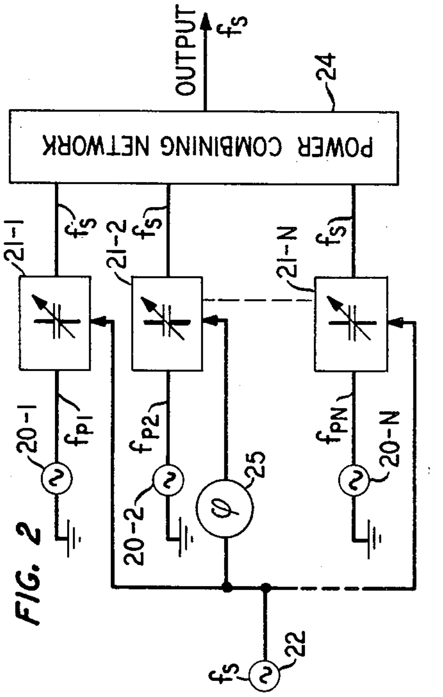
FIGS. 2 and 3 show two arrangements for phase-locking an array of separate signal sources and for adding their respective outputs.

FIG. 2, now to be described, illustrates an arrangement for phase-locking the output from a plurality of free-running signal sources. In this embodiment, each of the free-running signal sources 20–1, 20–2 . . . 20–N, provides the pump power for parametric devices 21–1, 21–2 . . . 21–N. Simultaneously, a synchronizing signal, derived from a common source 22 is coupled to each of the parametric devices. The phase-locked outputs from the parametric devices are then combined in a power combining network 24, to produce a phase-coherent amplifier output signal.

Maximum output is produced when the output signals from all of the parametric devices are in phase at the point at which they are combined. Accordingly, the electric lengths of the wavepaths connecting the common signal source to each of the parametric devices are made compatible with the relative phase combination required by the combining network. This can be done by adjusting the line lengths connecting source 22 to the parametric devices, or by including phase shifts, such as phase shifter 25, in some or all of the connecting wavepaths.

As in the embodiment of FIG. 1, any of the well-known parametric devices can be utilized in connection with the embodiment of FIG. 2. Network 24 can be a power combiner of the type described in U.S. Pat. 3,394,-318. Pump sources 20 can be IMPATT diodes.

Figure 3:
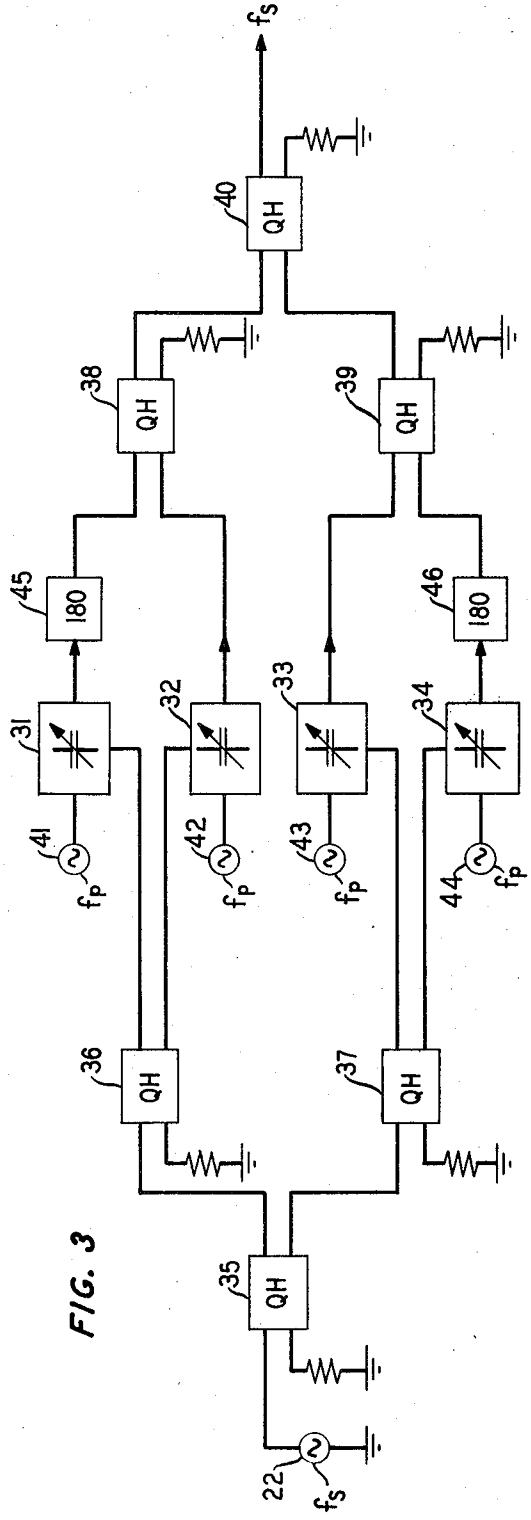

An alternative arrangement is illustrated in FIG. 3. In this third embodiment of the invention, the common signal source 22 is coupled to parametric devices 31, 32, 33 and 34 through a hybrid-coupled fan-out array of the type described in U.S. Pat. 3,444,475. In this particular illustration, three, 3 db quadrature hybrid couplers 35, 36 and 37 are used. However, larger fan-outs can be used as required.

The four output signals derived from couplers 36 and 37 are coupled, respectively, to a different one of the parametric devices, and phase locks each of them to signal source 22. As in the embodiment of FIG. 2, each of the parametric devices is pumped by a separate, free-running oscillator 41, 42, 43 and 44.

The outputs from the phase-locked devices are combined in a hybrid-coupled fan-in array to produce an output signal at the output of the array. This portion of the circuit, as illustrated in the above-identified Pat. 3,444,475, comprises three 3 db quadrature hybrid couplers 38, 39 and 40, and two 180 degree phase shifters 45 and 46, located in two of the array branches, as specified in said patent.

As indicated hereinabove, in each of the above-described embodiments, the primary power sources are permitted to free-run, thereby enabling each of them to operate at some preferred state uniquely peculiar to each of them. This permits each source to operate at its optimum state. Nevertheless, the ultimate signal derived from each parametric device is phase-locked to a common input signal. It will be noted, however, that one pays a price for this. From purely thermodynamic considerations, it is apparent that there must be some energy cost, however small, to produce order from a disordered relationship. In this case, the energy loss is that required by the idler circuits. While this loss may be small, it is necessary in view of the above. It is also apparent that this principle can be used for many different purposes. Thus, in all cases, it is understood that the above-described arrangements are illustrative of but a small number of the many possible specific embodiments which can represent applications of the principles of the invention. Clearly, numerous and varied other arrangements can readily be devised in accordance with these principles by those skilled in the art without departing from the spirit and scope of the invention.

I claim:

1. In combination:

a parametric device comprising a nonlinear reactance coupled to a signal circuit and an idler circuit;

a pumping source coupled to said reactance;

a source of frequency modulated signal coupled to said signal circuit;

and means for tuning said signal circuit in synchronism with the instantaneous frequency of said frequency modulated signal.

2. The combination according to claim 1 wherein the frequency modulated signal is frequency detected, and the detected signal is used to tune said signal circuit.

3. The combination according to claim 2 wherein said reactance is a varactor diode, and said detected signal varies the bias applied to said diode.

4. In combination:

a plurality of parametric devices;

a plurality of separate, free-running pump sources, each of which is coupled to a different parametric device;

means for phase-locking each of said devices to a common signal source;

and means for combining in a common circuit the phased-locked signals from said plurality of devices.

5. The combination according to claim 4, wherein said common source is coupled to said devices by means of a hybrid-coupled fan-out, and wherein the output signals from said devices are combined by means of a hybrid-coupled fan-in.

References Cited

UNITED STATES PATENTS 3,253,227 5/1966 Uenohara ---------- 330—4.8

ROBERT SEGAL, Primary Examiner

D. R. HOSTETTER, Assistant Examiner

U.S. Cl. X.R.

230—41, 53